(12) United States Patent
Fujimoto et al.

(10) Patent No.: US 8,381,869 B2
(45) Date of Patent: Feb. 26, 2013

(54) ELECTRIC POWER STEERING DEVICE

(75) Inventors: Masaki Fujimoto, Toyota (JP);
Masaharu Yamashita, Toyota (JP);
Kenichiro Aoki, Nishikamo-gun (JP);
Megumu Nishikohri, Aichi-gun (JP);
Akihiro Ohtomo, Toyota (JP); Eiji Kasai, Toyota (JP); Tsutomu Onagi, Nisshin (JP); Keitaro Niki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 296 days.

(21) Appl. No.: 12/672,321

(22) PCT Filed: Mar. 25, 2009

(86) PCT No.: PCT/JP2009/056780
§ 371 (c)(1),
(2), (4) Date: Feb. 5, 2010

(87) PCT Pub. No.: WO2010/109677
PCT Pub. Date: Sep. 30, 2010

(65) Prior Publication Data
US 2011/0272205 A1 Nov. 10, 2011

(51) Int. Cl.
B62D 5/04 (2006.01)
(52) U.S. Cl. .................. 180/446; 180/443; 180/444
(58) Field of Classification Search .................. 180/446, 180/444, 443
See application file for complete search history.

(56) References Cited

U.S. PATENT DOCUMENTS 6,922,621 B2 * 7/2005 Kodama et al. .................. 701/41
7,106,012 B2 * 9/2006 Matsuda et al. ................ 318/139
7,583,069 B2 * 9/2009 Suzuki ............................ 323/285
7,596,441 B2 * 9/2009 Yokota et al. ..................... 701/41
7,831,356 B2 * 11/2010 Yabuguchi et al. ............... 701/41
2003/0111291 A1 6/2003 Jonokuchi et al.

(Continued)

FOREIGN PATENT DOCUMENTS

JP 2003 153584 5/2003
JP 2003 244943 8/2003

(Continued)

OTHER PUBLICATIONS

International Search Report issued Aug. 11, 2009 in PCT/JP09/56780 filed Mar. 25, 2009.

Primary Examiner — James Kramer
Assistant Examiner — Michael Stabley
(74) Attorney, Agent, or Firm — Oblon, Spivak, McClelland, Maier & Neustadt, L.L.P.

(57) ABSTRACT

An electric power steering device for a vehicle includes an estimation mechanism estimating if there is a possibility that a backward electric current flows in a booster circuit toward a vehicle battery device, and a boosting controller stopping the boosting operation of the booster circuit to prevent a backward electric current from flowing in the booster circuit when it is estimated that there is a possibility that a backward electric current flows by the estimation mechanism. The estimation mechanism estimates that there is a possibility that a backward electric current flows in the booster circuit when the steering condition of a steering wheel is a returning condition or a steering-held condition. Otherwise, the estimation mechanism estimates if a backward electric current flows on the basis of input and output voltages of the booster circuit and information on the switching of a first boosting switching element. Thereby, overheat of the booster circuit can be prevented.

20 Claims, 11 Drawing Sheets

U.S. PATENT DOCUMENTS

2008/0066995 A1 * 3/2008 Yabuguchi et al. .......... 180/446
2009/0078493 A1   3/2009 Nagase

FOREIGN PATENT DOCUMENTS

| JP | 2003 319679 | 11/2003 |
| JP | 2003 319699 | 11/2003 |
| JP | 2007-91122 | 4/2007 |
| JP | 2008 172955 | 7/2008 |
| JP | 2008-221958 | 9/2008 |
| JP | 2008-265381 | 11/2008 |
| JP | 2008-296797 | 12/2008 |
| JP | 2009 78605 | 4/2009 |
| WO | 2007 004357 | 1/2007 |

* cited by examiner

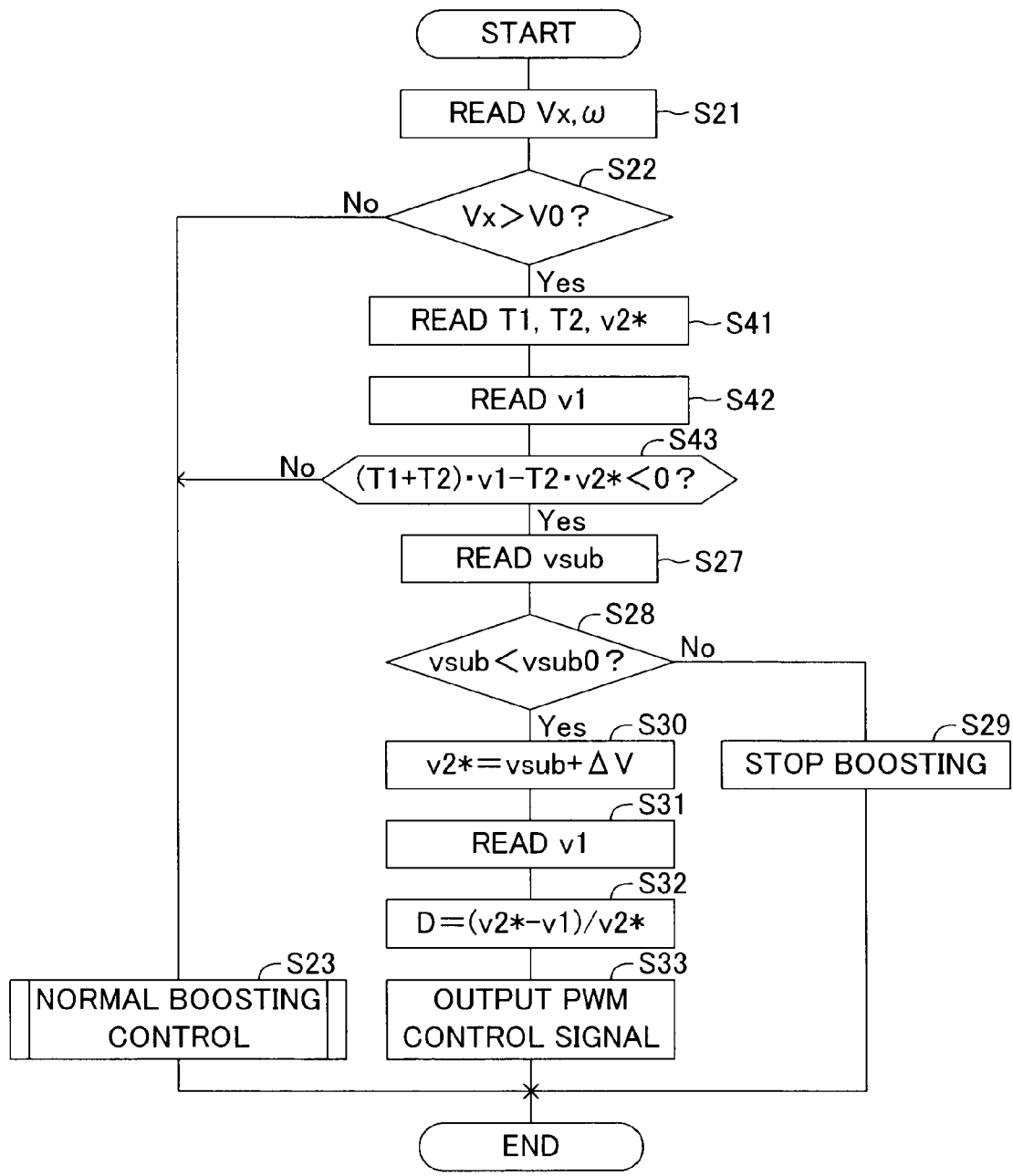

ELECTRIC POWER STEERING DEVICE

TECHNICAL FIELD

The present invention relates to an electric power steering device provided with an electric motor for applying a steering assist torque to a steering mechanism.

BACKGROUND ART

Conventionally, for example, in an electric power steering device, an electric motor is provided for applying a steering assist torque to a steering mechanism, and a steering operation by a driver is assisted by controlling energization of the electric motor. Such an electric power steering device is powered by a vehicle battery for supplying an electric power to general vehicle electric loads, and the consumption of the electric power is large. Accordingly, for example, in a device proposed in the Unexamined Japanese Patent Publication No. 2007-91122, a sub battery device is provided for assisting the vehicle battery. The sub battery device is constituted such that it is connected to a power supply line in parallel thereto from the vehicle battery to a motor drive circuit and is charged by the vehicle battery, and can supply an electric power to the motor drive circuit by using the charged electric energy. Further, in this electric power steering device, a booster circuit is provided for boosting a voltage of an electric power output from the vehicle battery to supply the boosted electric power to the motor drive circuit.

DISCLOSURE OF THE INVENTION

However, when a vehicle runs on a winding road such as a mountain road which curves right and left, the condition of the load of the electric motor is frequently switched between large and small load conditions, along with the steering operation. When a steering wheel is being largely turned, the electric motor is in the large load condition, while the steering wheel is held or being returned, the electric motor is in the small load condition. When the condition of the electric motor is changed from the large load condition to the small load condition, a surplus electric current which cannot be consumed by the electric motor, or an electric current generated by the motor, or an electric current output from the sub battery device flows in the booster circuit toward the vehicle battery. Accordingly, when the vehicle runs on the winding road, a forward current and a backward current alternately flow in a coil of the booster circuit, and the coil produces heat by a hysteresis loss of the coil.

The object of the present invention is to solve the above-mentioned problems and to prevent overheat of the coil of the booster circuit.

To accomplish the above-mentioned object, the feature of the present invention is that an electric power steering device comprises: an electric motor for applying a steering assist torque to a steering mechanism; a booster circuit for boosting a voltage of an electric power supplied from a vehicle battery device and supplying the boosted electric power to a motor drive circuit; a sub battery device connected to the booster circuit in parallel to the motor drive circuit and charged by the output of the booster circuit for assisting the power supply to the motor drive circuit by using the charged electric energy; and motor control means for controlling the motor drive circuit such that the electric motor is energized by the energization amount depending on a steering operation of a steering wheel; and is characterized in that the electric power steering device further comprises estimation means for estimating if there is a possibility that a backward electric current flows in the booster circuit toward the side of the vehicle battery device, and boost control means for stopping the boosting operation of the booster circuit to prevent a backward electric current from flowing in the booster circuit when it is estimated that there is a possibility that a backward electric current flows by the estimation means.

According to the present invention, the electric power supplied by the vehicle battery device is boosted by the booster circuit, and the boosted electric power is supplied to the motor drive circuit. Further, the sub battery device is connected to an electric power supply channel from the booster circuit to the motor drive circuit in parallel to the motor drive circuit. The sub battery device is charged by the output of the booster circuit, and assists an electric power supply to the motor drive circuit by using the charged electric energy.

When a vehicle runs on the winding road, a steering operation of the steering wheel is repeated. In the circumstances, the load condition of the electric motor is frequently switched between the large load condition (the large electric power consumption condition) and the small load condition (the small electric power consumption condition). When the load condition of the electric motor is changed from the large load condition to the small load condition, a backward electric current (an electric current flowing toward the side of the vehicle battery device) may flow in the booster circuit. In this case, the forward and backward electric currents, i.e. the alternate electric current flows in the booster circuit, and the coil provided in the booster circuit produces heat by the hysteresis loss.

According to the present invention, the estimation means estimates if there is a possibility that a backward electric current flows in the booster circuit toward the side of the vehicle battery device. Then, the boost control means stops the boosting operation of the booster circuit to prevent a backward electric current from flowing in the booster circuit when it is estimated that there is a possibility that a backward electric current flows.

As a result, according to the present invention, overheat of the booster circuit can be prevented.

The other feature of the present invention is that the estimation means has steering information acquisition means for acquiring information on a steering condition of the steering wheel, and estimates that there is a possibility that a backward electric current flows in the booster circuit when the steering condition detected on the basis of the information on the steering condition is a returning condition or steering-held condition of the steering wheel.

When the steering wheel is being turned (an operation for turning the steering wheel away from its neutral position), the electric motor is maintained in the large load condition, and therefore no backward electric current flows in the booster circuit. However, when the turning operation is terminated and the steering wheel is in the steering-held condition or the returning condition (a condition that the steering wheel is being turned in the direction to approach its neutral position), the electric motor is in the small load condition, and therefore a backward electric current is likely to flow in the booster circuit. Accordingly, in particular, immediately after the turning operation is terminated, a backward electric current is likely to flow in the booster circuit. Further, not immediately after the turning operation is terminated, when the steering wheel is being returned from a condition that the steering wheel is held in a large steering angle (a steering angle that the steering wheel is largely apart from its neutral position), the condition of the electric motor is changed from the large load condition to the small load condition, and therefore a backward electric current may flow in the booster circuit. Accordingly, except when the steering wheel is being turned, a backward electric current may flow in the booster circuit.

According to the present invention, information on a steering condition of the steering wheel is acquired by the steering information acquisition means and it is estimated that there is a possibility that a backward electric current flows in the boosting coil in the booster circuit when the steering condition detected on the basis of the information is the returning condition or the steering-held condition of the steering wheel.

It should be noted that for example, even by using an electric current sensor, due to an effect of measurement noises thereof, no backward electric current flowing in the booster circuit can be successively detected. On the other hand, according to the present invention, the possibility that a backward electric current flows, is estimated by the steering condition, and therefore overheat of the booster circuit can be appropriately prevented.

The other feature of the present invention is that the booster circuit has a boosting coil provided in the power supply channel in series thereto, a first switching element for intermittently flowing an electric current in the boosting coil to generate an electric energy in the boosting coil, and a second switching element provided in the power supply channel in series thereto for discharging the electric energy generated in the boosting coil to the power supply channel while the first switching element is switched off, and the estimation means has voltage information acquisition means for acquiring information on input and output voltages of the booster circuit, and switching information acquisition means for acquiring switching information indicating single switch-on and switch-off periods of the first switching element, and it is estimated if there is a possibility that a backward electric current flows on the basis of the acquired information on the input and output voltages and the acquired switching information.

According to the present invention, an electric energy is generated by switching the first switching element on and off in a short cycle to intermittently flow an electric current in the boosting coil. The electric energy is discharged to the power supply channel leading to the motor drive circuit by switching the second switching element on. The electric power having a voltage resulted by boosting the output voltage of the vehicle battery device is supplied to the motor drive circuit by the above-explained switching operation. In this case, it can be estimated if there is a possibility that a backward electric current flows in the boosting coil on the basis of the input and output voltages of the booster circuit and single switch-on and switch-off periods of the first switching element. According to the present invention, the voltage information acquisition means acquires information on input and output voltages of the booster circuit, and the switching information acquisition means acquires switching information indicating single switch-on and switch-off periods of the first switching element. Then, it is estimated if there is a possibility that a backward electric current flows on the basis of the acquired information. For example, when a value $[(T1+T2) \times v1 - (T2 \times v2)]$ obtained by subtracting a value $(T2 \times v2)$ obtained by multiplying the switch-off period $T2$ by the output voltage $v2$ from a value $(T1+2) \times v1$ obtained by multiplying the sum $(T1+T2)$ of the single switch-on and switch-off periods $T1$ and $T2$ of the first switching element by the input voltage $v1$, is negative, it can be estimated that a backward electric current flows. As a result, according to the present invention, overheat of the booster circuit can be prevented.

It should be noted that the switching information is not limited to information directly indicating single switch-on and switch-off periods of the first switching element, and may be information which can lead to them. For example, the switching information may be information indicating a switching cycle and a duty ratio of the first switching element.

The other feature of the present invention is that the booster circuit has a boosting coil provided in the power supply channel in series thereto, a first switching element for intermittently flowing an electric current in the boosting coil to generate an electric energy in the boosting coil, and a second switching element provided in the power supply channel in series thereto for discharging the electric energy generated in the boosting coil to the power supply channel while the first switching element is switched off, and the boosting control means maintains the both of the first and second switching elements in the switch-off condition when the boosting operation of the boosting circuit is stopped.

The booster circuit according to the present invention switches the first switching element on and off to intermittently flow an electric current in the boosting coil to generate an electric energy in the boosting coil. For example, the booster circuit grounds the boosting coil to flow an electric current in the boosting coil by a switch-on operation of the first switching element. The electric energy generated in the boosting coil is discharged to the power supply channel by the switch-on operation of the second switching element provided in the power supply channel in series thereto. Thereby, the booster circuit boosts an electric power supplied from the vehicle battery device.

According to the present invention, when the boosting operation of the booster circuit is stopped, no backward electric current flows in the booster circuit via the second switching element by maintaining the both of the first and second switching elements in the switch-off condition. Accordingly, the generation of a backward electric current can be surely prevented.

The other feature of the present invention is that the electric power steering device comprises sub battery ability detection means for detecting an electric power supply ability of the sub battery device, wherein in place of the stopping of the boosting operation, the boosting control means controls the boosting such that the output voltage of the booster circuit is maintained at a voltage higher than the output voltage of the sub battery device when it is estimated that there is a possibility that a backward electric current flows by the estimation means and the electric power supply ability of the sub battery device is smaller than a prescribed value.

According to the present invention, the sub battery ability detection means detects an electric power supply ability of the sub battery device. For example, the sub battery ability detection means detests the output voltage of the sub battery device and detects an electric power supply ability of the sub battery device by the level of the detected output voltage. The electric power supply to the motor drive circuit is automatically changed on the basis of the balance (level relation of the voltages) in the output voltage between the booster circuit and the sub battery device, and therefore when the boosting operation of the booster circuit is stopped, the electric power is supplied to the motor drive circuit only from the sub battery device which is in the high voltage condition. When the electric power supply ability of the sub battery device is large, if an electric power is supplied to the motor drive circuit only from the sub battery device, no problem occurs, however, when the electric power supply ability of the sub battery device decreases, if an electric power supply from the booster circuit to the motor drive circuit is stopped, the supply of the electric power to the electric motor become short, and therefore no desired steering assist property may be obtained.

Further, when an amount of an electric power requested by the electric motor becomes large (at the large output drive), if the electric power supply ability of the sub battery device decreases, the sum of the outputs of the booster circuit and the sub battery device may not meet the requested amount of the electric power, and therefore no desired steering assist property may not be obtained.

According to the present invention, when the electric power supply ability of the sub battery device is below a prescribed value and it is estimated that there is a possibility that a backward electric current flows, in place of the stopping of the boosting operation, the boosting is controlled such that the output voltage of the booster circuit is maintained at a voltage higher than the output voltage of the sub battery device. Thereby, an electric current which is generated in the electric motor and a surplus electric current which cannot be consumed by the electric motor flow to the sub battery device, which is in the low voltage condition, as a charging electric current. Accordingly, no backward electric current flows in the booster circuit, and therefore overheat due to a hysteresis loss of the boosting coil can be prevented. Further, the electric power supply ability of the sub battery device can be increased.

The other feature according to the present invention is that the estimation means has vehicle speed information acquisition means for acquiring information on a vehicle speed, and estimates if there is a possibility that a backward electric current flows, provided that the vehicle runs while the vehicle speed indicated by the information on the vehicle speed is larger than or equal to a predetermined vehicle speed.

The case that a backward electric current flows and the boosting coil of the booster circuit produces heat, is a case that the steering wheel is repeatedly turned in clockwise and counterclockwise directions. When the vehicle is stopped, such a steering operation rarely occurs. According to the present invention, it is estimated if there is a possibility that a backward electric current flows, provided that information on the vehicle speed is acquired by the vehicle speed information acquisition means and the vehicle runs while the vehicle speed is larger than or equal to a predetermined vehicle speed. Accordingly, a process operated by the backward electric current estimation means is decreased.

BRIEF DESCRIPTION OF THE DRAWINGS

FIG. 11 is a flow chart showing a boosting control routine (main routine) of a second embodiment.

MODE FOR CARRYING OUT THE INVENTION

Figure 1:
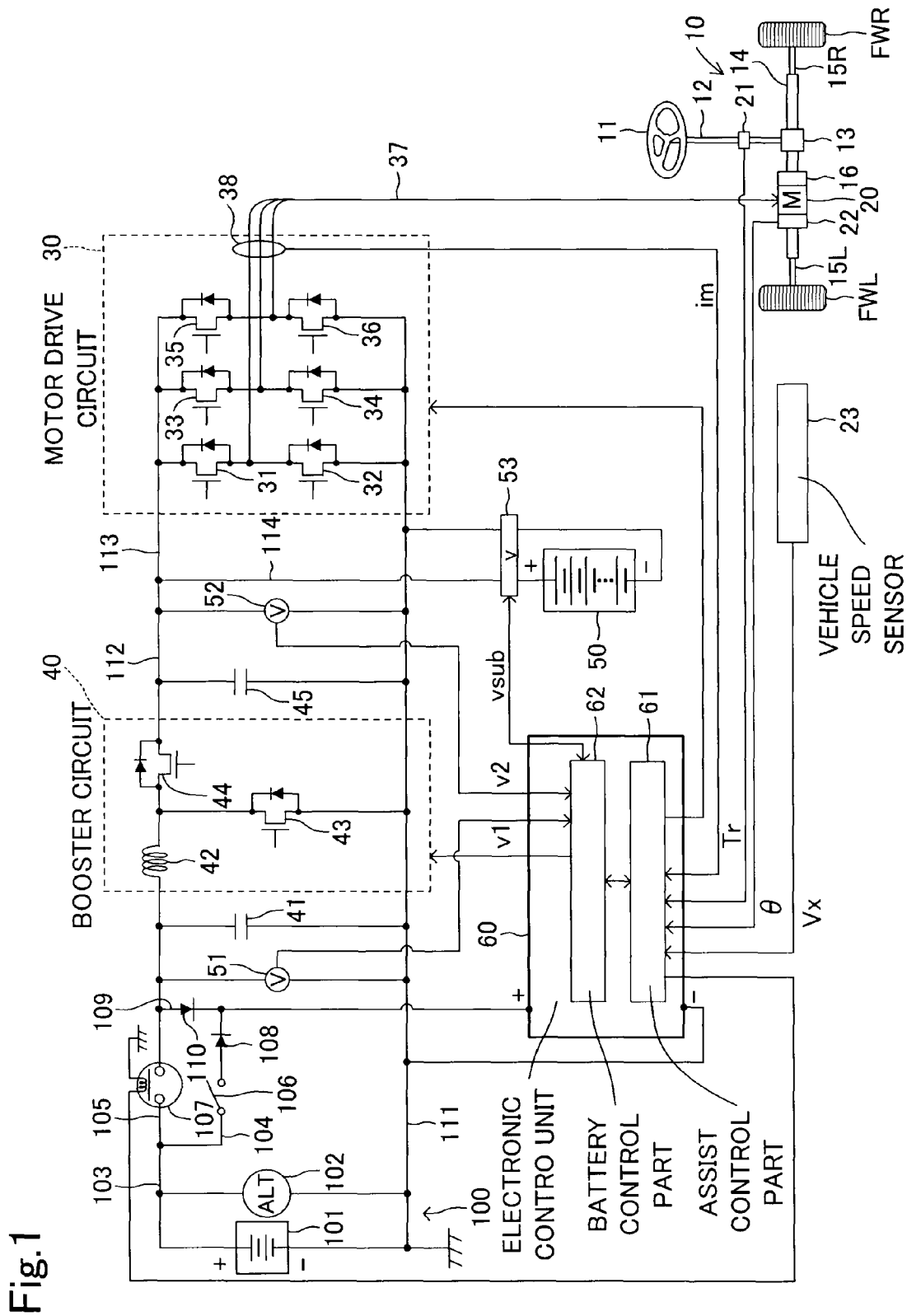
FIG. 1 is a schematic configuration view of an electric power steering device of an embodiment according to the invention.

Below, an electric power steering device of an embodiment according to the invention will be explained, referring to the drawings. FIG. 1 is a schematic configuration view of an electric power steering device for a vehicle of the embodiment.

The electric power steering device comprises, as a main part, a steering mechanism 10 for turning wheels to be turned by a steering operation of a steering wheel 11, an electric motor 20 assembled to the steering mechanism 10 for generating a steering assist torque, a motor drive circuit 30 for driving the electric motor 20, a booster circuit 40 for boosting a voltage of an electric power output from a vehicle battery device 100 and supplying the electric power to the motor drive circuit 30, a sub battery device 50 connected to an electric power supply circuit positioned between the booster circuit 40 and the motor drive circuit 30 in parallel to the electric power supply circuit, and an electronic control unit 60 for controlling operations of the electric motor 20 and the booster circuit 40.

The steering mechanism 10 is a mechanism for turning right and left front wheels FWL and FWR by a rotation operation of the steering wheel 11, and has a steering shaft 12 integrally rotatably connected to the steering wheel 11 at its upper end. A pinion gear 13 is integrally rotatably connected to a lower end of the steering shaft 12. The pinion gear 13 engages with rack teeth formed in a rack bar 14, and therefore constitutes a rack-and-pinion mechanism along with the rack bar 14. Knuckles (not shown) of the right and left front wheels FWL and FWR are steerably connected to the ends of the rack bar 14 via tie rods 15L and 15R, respectively. The right and left front wheels FWL and FWR are horizontally steered, depending on an axial displacement of the rack bar 14 along with the rotation of the steering shaft 12 around its axis.

The electric motor 20 for assisting a steering is assembled to the rack bar 14. For example, a three-phase brushless motor is used as the electric motor 20. A rotation shaft of the electric motor 20 is connected to the rack bar 14 via a ball screw mechanism 16 in a power transmittable manner, and applies a turning force to the right and left front wheels FWL and FWR by a rotation of the rotation shaft to assist a steering. The ball screw mechanism 16 functions as a reducer and a rotation-linear converter, and reduces the rotation of the electric motor 20, converts it to a linear motion, and transmits it to the rack bar 14.

A steering torque sensor 21 is provided in the steering shaft 12. The steering torque sensor 21 outputs a signal corresponding to a steering torque acting on the steering shaft 12 by the rotation operation of the steering wheel 11. Hereinafter, a value of the steering torque detected by the signal output from the steering torque sensor 21 is referred to as a steering torque Tr. A direction of the turning of the steering wheel 11 is identified on the basis that the value of the steering torque Tr is positive or negative. According to this embodiment, the steering torque Tr is represented as a positive value when the steering wheel 11 is turned in a clockwise direction and the steering torque Tr is represented as a negative value when the steering wheel 11 is turned in a counterclockwise direction. Accordingly, the magnitude of the steering torque Tr is an absolute value thereof.

A rotation angle sensor 22 is provided in the electric motor 20. The rotation angle sensor 22 is assembled in the electric motor 20, and outputs a detection signal corresponding to a rotation angle position of a rotor of the electric motor 20. The detection signal of the rotation angle sensor 22 is used to calculate a rotation angle of the electric motor 20 and a rotation angle speed of the electric motor 20. On the other hand, the rotation angle of the electric motor 20 is proportional to a steering angle of the steering wheel 11, and therefore the rotation angle of the electric motor 20 is commonly used as the steering angle of the steering wheel 11. Further, the rotation angle speed obtained by temporally differentiating the rotation angle of the electric motor 20 is proportional to a steering angle speed of the steering wheel 11, and therefore the rotation angle speed is commonly used as the steering speed of the steering wheel 11. Hereinafter, a value of the steering angle of the steering wheel 11 detected by the signal output from the rotation angle sensor 22 is referred to as a steering angle θ, and a value of the steering angle speed obtained by temporally differentiating the steering angle θ is referred to as a steering speed ω. The positive steering angle θ represents steering angle in the clockwise direction relative to a neutral position of the steering wheel 11, and the negative steering angle θ represents steering angle in the counterclockwise direction relative to the neutral position of the steering wheel 11. In this embodiment, the neutral position of the steering wheel 11 is "0", the steering angle in the clockwise direction relative to the neutral position is represented as a positive value, and the steering angle in the counterclockwise direction relative to the neutral position is represented as a negative value.

The motor drive circuit 30 constitutes a three-phase inverter circuit by six switching elements 31-36 constituted by MOS-FET (Metal Oxide Semiconductor Field Effect Transistor). Concretely, the motor drive circuit 30 employs an arrangement constituted by parallely connecting to each other a circuit constituted by serially connecting the first and second switching elements 31 and 32 to each other, a circuit constituted by serially connecting the third and fourth switching elements 33 and 34 to each other, and a circuit constituted by serially connecting the fifth and sixth switching elements 35 and 36 to each other, and by leading electric power supply lines 37 to the electric motor 20 from intermediate points between the switching elements (31 and 32, 33 and 34, and 35 and 36) of each series circuit, respectively.

An electric current sensor 38 is provided in the motor drive circuit 30 for detecting an electric current flowing to the electric motor 20. The electric current sensor 38 detects an electric current flowing in each phase, and outputs a detection signal corresponding to the detected electric current value to the electronic control unit 60. Hereinafter, the measured electric current value is referred to as a motor electric current im and the electric current sensor 38 is referred to as a motor electric current sensor 38.

A gate of each switching element 31-36 is connected to an assist control part 61 (explained below) of the electronic control unit 60, and a duty ratio thereof is controlled by a PWM control signal from the assist control part 61. Thereby, a drive voltage of the electric motor 20 is adjusted to a target voltage. It should be noted that as shown by circuit symbols in the drawings, parasitic diode is produced in the MOS-FET constituting the switching elements 31-36 due to the structure thereof.

Next, an electric power supply system of the electric power steering device will be explained.

A battery device of the electric power steering device has the vehicle battery device 100, the booster circuit 40 for boosting an output voltage of the vehicle battery device 10, the sub battery device 50 connected to a point between the booster circuit 40 and the motor drive circuit 30 in parallel thereto, and the battery control part 62 provided in the electronic control unit 60 for controlling the boosting voltage of the booster circuit 40.

The vehicle battery device 100 is constituted by parallely connecting to each other a main battery 101 which is a general vehicle battery having a rated output voltage 12V and an alternator 102 having a rated output voltage 14V for generating an electric power by the rotation of an engine.

The vehicle battery device 100 supplies an electric power to the electric power steering device as well as the other vehicle electric loads such as headlights. An electric power supply source line 103 is connected to a battery terminal (a plus terminal) of the main battery 101, and a ground line 111 is connected to a ground terminal of the main battery 101.

The electric power supply source line 103 divides into a control system battery line 104 and a drive system battery line 105. The control system battery line 104 functions as a battery line for supplying an electric power only to the electronic control device 60. The drive system battery line 105 functions as a battery line for supplying an electric power to both of the motor drive circuit 30 and the electronic control unit 60.

An ignition switch 106 is connected to the control system battery line 104. A battery relay 107 is connected to the drive system battery line 105. The battery relay 107 is switched on by a control signal from the assist control part 61 of the electronic control unit 60 to form an electric power supply circuit to the electric motor 20. The control system battery line 104 is connected to a battery plus terminal of the electronic control unit 60, and on the way thereto, has a diode 108 at the load side (at the electronic control device 60 side) of the ignition switch 106. The diode 108 is a backflow prevention element provided such that a cathode thereof is positioned at the side of the electronic control unit 60 and an anode thereof is positioned at the side of the vehicle battery device 100 and can flow an electric current only in the electric power supply direction.

A coupling line 109 is provided in the drive system battery line 105 such that the coupling line 109 branches from the drive system battery line 105 and is connected to the control system battery line 104 at the load side of the battery relay 107. The coupling line 109 is connected to the control system battery line 104 at the side of the electronic control unit 60 relative to the diode 108 provided in the control system battery line 104. Further, a diode 110 is connected to the coupling line 109. The diode 110 is provided such that a cathode thereof is positioned at the side of the control system battery line 104 and an anode thereof is positioned at the side of the drive system battery line 105. Accordingly, a circuit is constituted such that an electric power can be supplied from the drive system battery line 105 to the control system battery line 104 via the coupling line 109 while no electric power can be supplied from the control system battery line 104 to the drive system battery line 105. The drive system battery and ground lines 105 and 111 are connected to the booster circuit 40. Further, the ground line 111 is also connected to a ground terminal of the electronic control unit 60.

The booster circuit 40 has a boosting coil 42 provided in the drive system battery line 105 in series therewith, a first boosting switching element 43 provided between points on the drive system battery line 105 at the load side of the boosting coil 42 and on the ground line 111, and a second boosting switching element 44 provided in the drive system battery line 105 in series therewith at the load side of a point wherein the first boosting switching element 43 and the drive system battery line 105 are connected to each other.

A condenser 41 is provided between the drive system battery line 105 and the ground line 111 at the input side of the booster circuit 40, and a condenser 45 is provided between the drive system battery line 105 and the ground line 111 at the output side of the booster circuit 40. A part of the drive system battery line 105 at the load side of the point wherein the drive system battery line 105 and the condenser 45 are connected to each other is referred to as a boosting battery line 112.

According to this embodiment, MOS-FET is used as the boosting switching elements 43 and 44, however, the other type of switching elements can be used. Further, as shown by circuit symbols in the drawings, parasitic diodes are produced in the MOS-FET constituting the boosting switching elements 43 and 44 due to the structure thereof. The parasitic diode of the boosting switching element 43 prevents an electric current from flowing from the drive system battery line 105 to the ground line 111, and allows an electric current to flow from the ground line 111 to the drive system battery line 105. The parasitic diode of the boosting switching element 44 prevents an electric current from flowing from the motor drive circuit 30 to the vehicle battery device 100, and allows an electric current to flow from the vehicle battery device 100 to the motor drive circuit 30.

The boosting operation of the booster circuit 40 is controlled by the battery control part 62 of the electronic control device 60. The battery control part 62 outputs a pulse signal having a predetermined cycle to the gates of the first and second boosting switching elements 43 and 44 to switch on and off both of the boosting switching elements 43 and 44 and boosts a voltage of an electric power supplied from the vehicle battery device 100 to generate a predetermined output voltage in the boosting battery line 112. In this case, the first and second boosting switching elements 43 and 44 are controlled such that the switch-on-and-off operation of the first boosting switching element 43 is always opposed to that of the second boosting switching element 44. The booster circuit 40 operates to switch on the first boosting switching element 43 and switch off the second boosting switching element 44 to flow an electric current in the boosting coil 42 for a short period to store an electric energy in the boosting coil 42, and thereafter to switch off the first boosting switching element 43 and switch on the second boosting switching element 44 to output the electric energy stored in the boosting coil 42.

The output voltage of the second boosting switching element 44 is smoothed by the condenser 45. Accordingly, a stable boosted electric power is output from the boosting battery line 112. In this case, a plurality of condensers having different frequency properties may be connected to each other in parallel to enhance the smoothing property. Further, a noise toward the vehicle battery device 100 can be removed by the condenser 41 provided at the input side of the boosting circuit 40.

The boosting voltage (output voltage) of the booster circuit 40 can be adjusted by controlling a duty ratio of the first and second boosting switching elements 43 and 44. The booster circuit 40 of this embodiment is constituted, for example, such that it can adjust the boosting voltage in a range between the input voltage thereof and 50V.

A voltage sensor 51 (hereinafter, referred to as an input voltage sensor 51) is provided at the input side of the booster circuit 40 for detecting a voltage of an electric power input to the booster circuit 40. Further, a voltage sensor 52 (hereinafter, referred to as an output voltage sensor 52) is provided at the output side of the booster circuit 40 for detecting an output voltage of the booster circuit 40. Hereinafter, the voltage value detected by the input voltage sensor 51 is referred to as a boosting input voltage v1 and the voltage value detected by the output voltage sensor 52 is referred to as a boosting output voltage v2. The input and output voltage sensors 51 and 52 output signals representing the boosting input and output voltages v1 and v2, respectively, to the battery control part 62.

The boosting battery line 112 divides into a boosting drive line 113 and a charging and discharging line 114. The boosting drive line 113 is connected to an electric power input part of the motor drive circuit 30. The charging and discharging line 114 is connected to a plus terminal of the sub battery device 50.

The sub battery device 50 is a storage device which is charged by the output of the booster circuit 40, and when a large electric power is required in the motor drive circuit 30, supplies an electric power to the motor drive circuit 30 by using the stored electric energy to assist the vehicle battery device 100. Accordingly, the sub battery device 50 is constituted by connecting a plurality of storage cells in series with each other such that a voltage corresponding to the boosting voltage of the booster circuit 40 can be maintained. A ground terminal of the sub battery device 50 is connected to the ground line 111. For example, as the sub battery device 50, a capacitor (electric double-layer condenser) or a secondary cell can be used.

A voltage sensor 53 is provided in the sub battery device 50. The voltage sensor 53 has a switch (not shown) therein for shutting the connection of the boosting drive line 113 and the sub battery device 50 to each other. Then, when the voltage sensor 53 receives a voltage measurement command from the battery control part 62, the voltage sensor 53 temporarily switches off the switch, detects a voltage between the terminals of the sub battery device 50, and outputs a detection signal to the battery control part 62. Hereinafter, the voltage sensor 53 is referred to as a sub battery voltage sensor 53, and the voltage value detected by the sub battery voltage sensor 53 is referred to as a sub battery voltage vsub.

The sub battery voltage vsub changes, depending on the charged condition (the storage amount) of the sub battery device 50. That is, as the charged condition of the sub battery device 50 is appropriate (the storage amount is large), the sub battery voltage vsub is high, while as the charged condition of the sub battery device 50 degrades (the storage amount is small), the sub battery voltage vsub is low. Accordingly, the sub battery voltage sensor 53 corresponds to sub battery ability detection means of the invention.

Normally, except when the sub battery voltage vsub is detected, the sub battery device 50 is connected to the boosting drive line 113. Accordingly, normally, the charging and discharging of the sub battery device 50 are automatically switched therebetween, depending on the relationship in the magnitude between the output voltage of the boosting circuit 40 and the output voltage (the battery voltage) of the sub battery device 50. When the output voltage of the booster circuit 40 is higher than the output voltage of the sub battery device 50, an electric power is supplied from the boosting circuit 40 (i.e. from the vehicle battery device 100) to the motor drive circuit 30 and the sub battery device 50 is charged. On the other hand, when the output voltage of the booster circuit 40 is lower than the output voltage of the sub battery device 50, an electric power is supplied from the sub battery device 50 to the motor drive circuit 30. Accordingly, when the electric power used in the electric motor 20 increases and the output voltage of the booster circuit 40 decreases, an electric power is supplied from the sub battery device 50 to the electric motor 20 for compensating the temporary shortage of the output of the booster circuit 40.

Next, the electronic control unit 60 will be explained. The electronic control unit 60 is constituted by a micro computer having CPU, ROM, RAM, etc. as a main part and is generally classified in view of the functions thereof into the assist control part 61 and the battery control part 62. The assist and battery control parts 61 and 62 are constituted such that they can communicate information therebetween.

The assist control part 61 is connected to the steering torque sensor 21, the rotation angle sensor 22, the motor electric current sensor 38 and the vehicle speed sensor 23, and sensor signals representing the steering torque Tr, the steering angle θ, the motor electric current im and the vehicle speed Vx are input to the assist control part 61. The assist control part 61 outputs a PWM control signal to the motor drive circuit 30 to control the drive of the electric motor 20 on the basis of the sensor signals, and assists the steering operation of the driver.

The battery control part 62 is connected to the input voltage sensor 51, the output voltage sensor 52 and the sub battery voltage sensor 53, and sensor signals representing the boosting input voltage v1, the boosting output voltage v2 and the sub battery voltage vsub are input to the battery control part 62. The battery control part 62 outputs a PWM control signal to the booster circuit 40 to control the boosting voltage of the booster circuit 40 on the basis of the sensor signals and information from the assist control part 61. Duty ratios of the first and second boosting switching elements 43 and 44 of the booster circuit 40 are controlled by the input PWM control signal, and the booster circuit 40 changes the boosting voltage which is the output voltage thereof.

Figure 2:
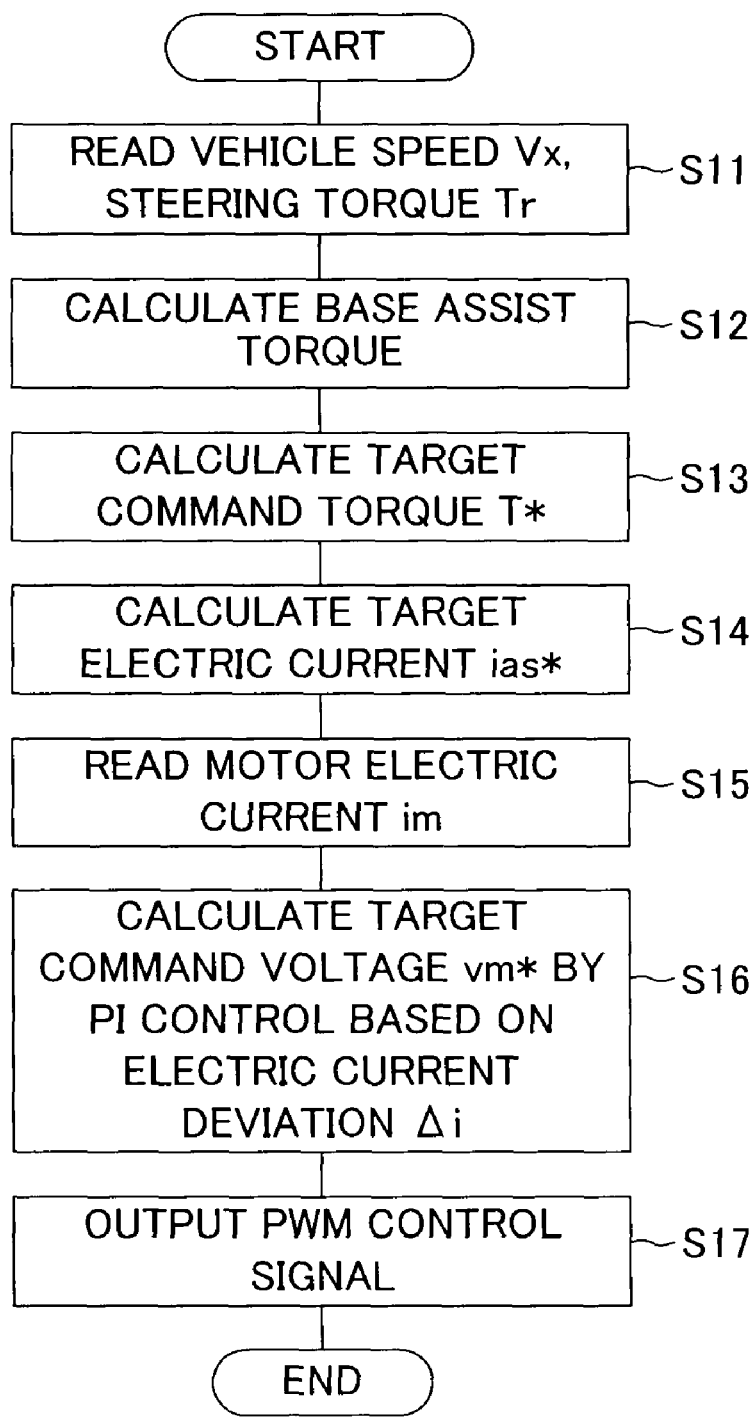
FIG. 2 is a flow chart showing a steering assist control routine.

Next, a steering assist control process performed by the assist control part 61 of the electronic control device 60 will be explained. FIG. 2 shows a steering assist control routine performed by the assist control part 61. The steering assist control routine is memorized in the ROM of the electronic control unit 60 as a control program, is initiated by the switch-on (on) of the ignition switch 106, and is performed repeatedly by a predetermined short cycle.

When this control routine is initiated, first, at step S11, the assist control part 61 reads a vehicle speed Vx detected by the vehicle speed sensor 23 and a steering torque Tr detected by the steering torque sensor 21.

Figure 3:
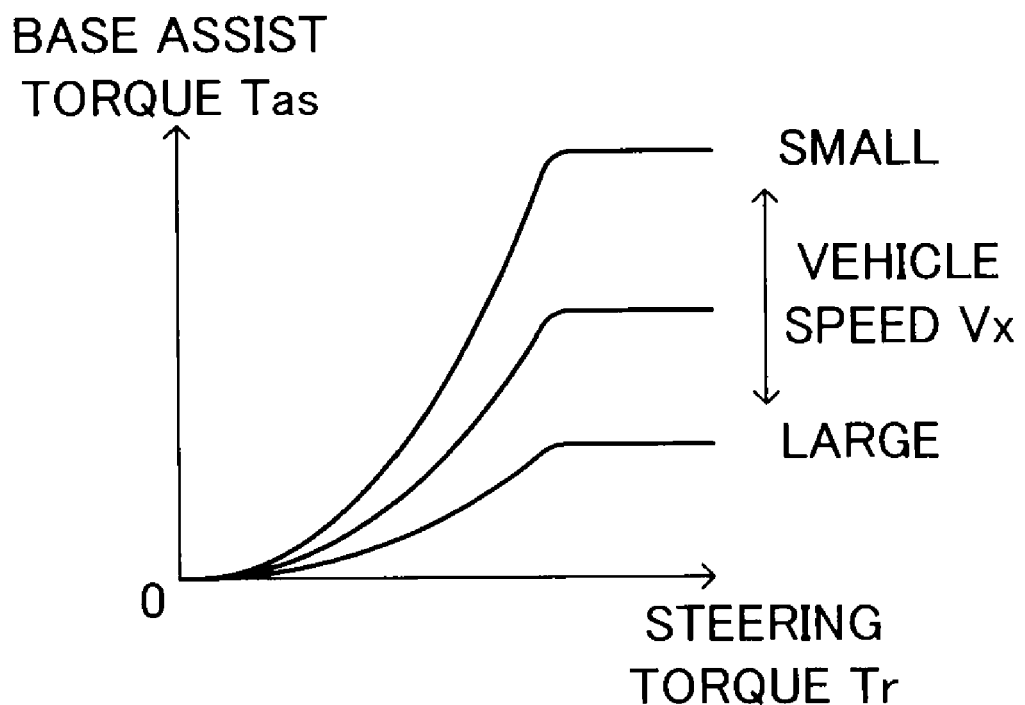
FIG. 3 is a property view showing an assist torque map.

Next, at step S12, a base assist torque Tas set depending on the input vehicle speed Vx and the input steering torque Tr is calculated, referring to an assist torque map shown in FIG. 3. The assist torque map is memorized in the ROM of the electronic control device 60, and is set such that the base assist torque Tas increases along with the increase of the steering torque Tr and the base assist torque Tas increases as the vehicle speed Vx decreases. It should be noted that the assist torque map shown in FIG. 3 represents a property of the base assist torque Tas relative to the clockwise steering torque Tr, and the absolute value of the base assist torque relative to the counterclockwise steering torque is the same as that relative to the clockwise steering torque while the orientation of the property relative to the counterclockwise steering torque is opposed to that relative to the clockwise steering torque.

Next, at step S13, the assist control part 61 calculates a target command torque T* by adding a compensation torque to the base assist torque Tas. The compensation torque is calculated, for example, as a sum of a force required to return the steering shaft 12 to its base position, which force increases in proportion to the steering angle θ and a returning torque corresponding to a resisting force having a direction opposed to that of the rotation of the steering shaft 12, which returning force increases in proportion to the steering speed ω. This calculation is performed by inputting a rotation angle (corresponding to the steering angle θ of the steering wheel 11) of the electric motor 20, which is detected by the rotation angle sensor 22. Further, the steering speed ω is obtained by temporally differentiating the steering angle θ of the steering wheel 11.

Next, at step S14, the assist control part 61 calculates a target electric current ias* proportional to the target command torque T*. The target electric current ias* is limited to a value smaller than or equal to a predetermined upper limit electric current value. Accordingly, when the target electric current ias* calculated on the basis of the target command torque T* is smaller than or equal to the upper limit electric current value, the calculated value itself is set to the target electric current ias*, however, when the target electric current ias* calculated on the basis of the target command torque T* exceeds the upper limit electric current value, the upper limit electric current value is set to the target electric current ias*.

When the target electric current ias* is set as explained above, at step S15, the assist control part 61 reads a motor electric current im flowing in the electric motor 20 from the motor electric current sensor 38. Next, at step S16, a deviation Δi between the motor electric current im and the target electric current ias* is calculated, and a target command voltage vm* is calculated by a feedback control based on the deviation Δi. According to this embodiment, PI control (proportional-integral control) based on the deviation Δi is performed.

Next, at step S17, the assist control part 61 outputs a PWM control signal depending on the target command voltage vm* to the motor drive circuit 30 and terminates this control routine once. This control routine is repeatedly performed by a predetermined short cycle. Accordingly, by performing this control routine, the duty ratios of the switching elements 31-36 of the motor drive circuit 30 are adjusted, the drive of the electric motor 20 is controlled, and a desired assist torque can be obtained, depending on the steering operation of the driver.

When the above-explained steering assist control is being performed, in particular, at a stationary steering or at a turning of the steering wheel during a low speed running, a large electric power is required. However, it is not preferred that the capacity of the vehicle battery device 100 is increased, providing for a temporary large electric power consumption. According to the electric power steering device of this embodiment, without increasing the capacity of the vehicle battery device 100, the sub battery device 50 is provided for assisting the electric power supply from the vehicle battery device 100 at a temporary large electric power consumption. Further, the booster circuit 40 is provided for efficiently driving the electric motor 20, and constitutes a system for supplying an electric power having a boosted voltage to the electric motor 20 and the sub battery device 50.

In case that the booster circuit 40 is provided, the heat production in the boosting coil 42 becomes a problem. For example, when the vehicle runs on a winding road such as a mountain road, the steering operation of the steering wheel 11 is repeated. Under the circumstances, the load condition of the electric motor 20 frequently switches between the large and small load conditions. As shown by arrows in FIG. 4, when the load condition of the electric motor 20 switches from the large load condition to the small load condition, a surplus electric current which cannot be consumed by the electric motor 20, an electric current which is generated by the electric motor 20, and an electric current which is output from the sub battery device 50 flow in the boosting coil 42 toward the vehicle battery device 100. The surplus electric current which cannot be consumed by the electric motor 20 is, for example, an electric current generated by a surplus energy out of the electric energy stored in the condenser 45, which cannot be discharged to the electric motor 20. It should be noted that in FIG. 4, elements such as sensors or the like, which are unnecessary for the explanation of the embodiment are omitted.

Accordingly, when the load condition of the electric motor 20 frequently switches between the large and small load conditions, positive-flow and backward-flow electric currents alternately flow in the boosting coil 42, that is, an alternate electric current flows in the boosting coil 42, and therefore the boosting coil 42 produces heat due to the hysteresis loss thereof. In order to solve the problem of the heat production in the boosting coil 42, for example, when the heat production of the boosting coil 42 is detected, the upper limit electric current value of the electric motor 20 in the steering assist control is set to a small value, and as a result the overheat can be prevented, however, the steering assist property is limited.

Figure 4:
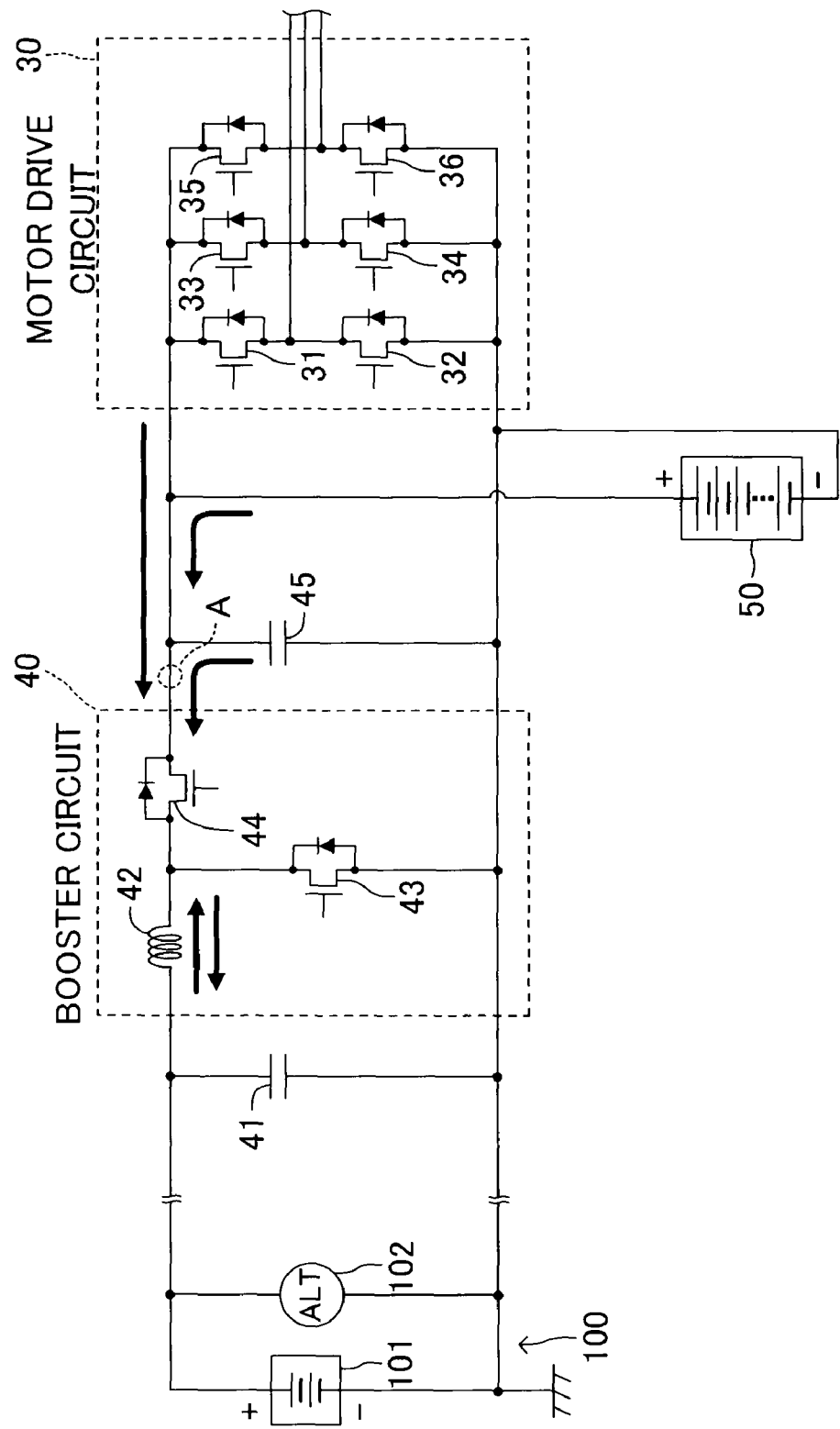
FIG. 4 is a view for explaining a flow of a backward electric current.

Further, as shown by chain line in FIG. 4, an electric current sensor A is provided in the output line of the booster circuit 40, and when the flow of the backward electric current in the booster circuit 40 is detected by the electric current sensor A, if the second boosting switching element 44 is switched off, theoretically, the overheat of the boosting coil 42 can be prevented, however, in fact, the measured value of the electric current is subject to an effect of a noise, and therefore it is difficult to determine that a backward electric current flows. Even when the threshold for determination is adjusted or a filter process is performed in order to avoid the effect of noise, the instantaneous generation of the backward electric current cannot be prevented.

Further, when a diode is provided at the output side of the booster circuit 40 (for example, at a point of the electric current sensor A shown in FIG. 4), the flow of the backward electric current can be prevented, however, another problem such that the diode becomes a circuit resistance and produces heat, occurs.

According to this embodiment, it is estimated if there is a possibility that a backward electric current flows on the basis of the steering condition, and when the steering condition is in the condition that there is a possibility that a backward electric current flows, the booster circuit 40 is controlled such that a backward electric current does not flow.

Figure 5:
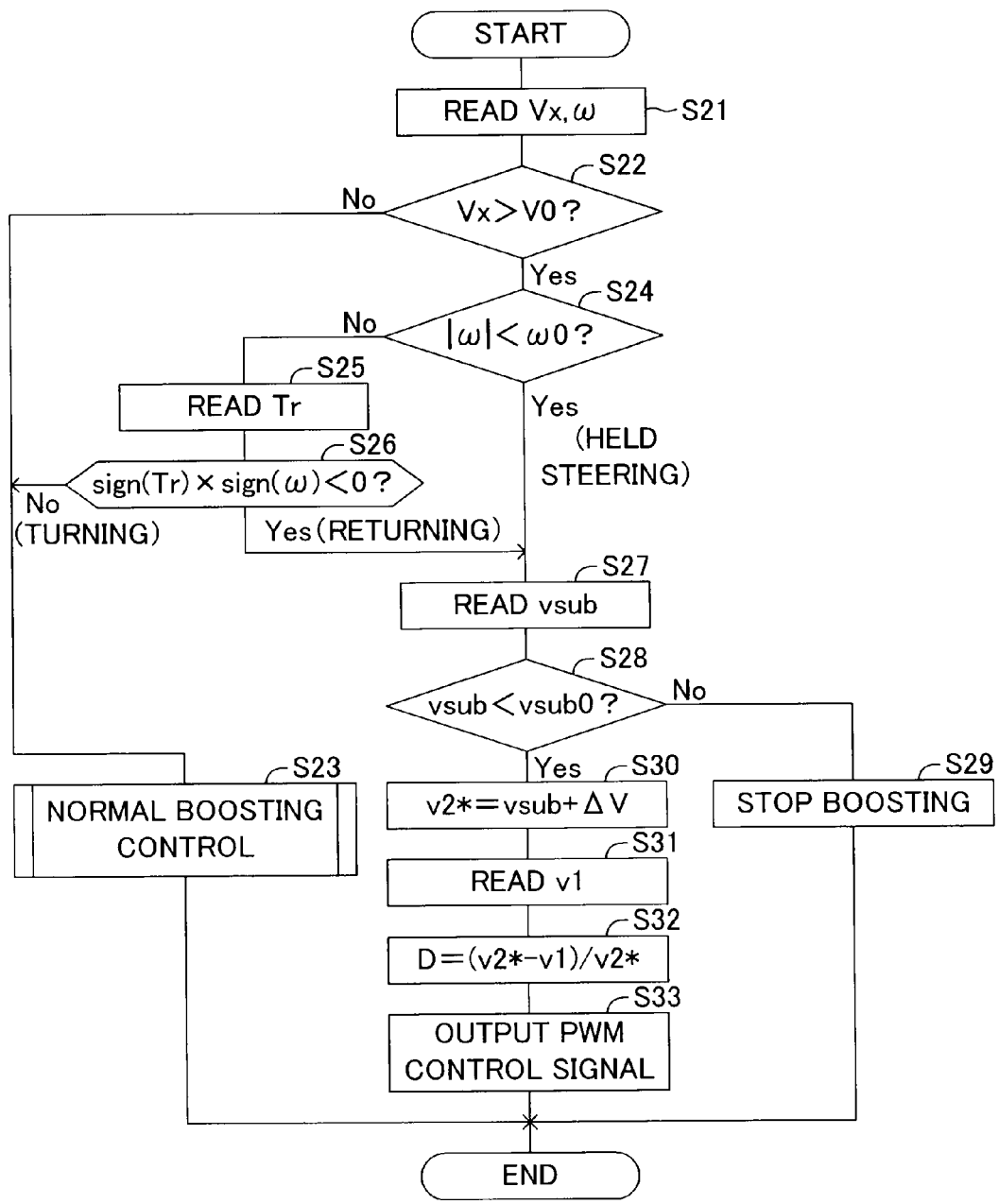
FIG. 5 is a flow chart showing a boosting control routine (main routine).

Below, two embodiments relating to a boosting control process will be explained. First, a first embodiment of the boosting control process will be explained. FIG. 5 shows a boosting control routine performed by the battery control part 62. The booster control routine is memorized in the ROM of the electronic control unit 60 as a control program, is initiated by the switch-on (on) of the ignition switch 106, and is repeatedly performed by a predetermined short cycle.

When this boosting control routine is initiated, at step S21, the battery control part 62 reads from the assist control part 61 a vehicle speed Vx detected by the vehicle speed sensor 23 and a steering speed ω detected by the rotation angle sensor 22. The steering speed ω is a speed for turning the steering wheel 11 by the driver, and is calculated by temporally differentiating the steering angle θ by the assist control part 61. Next, at step S22, the battery control part 62 determines if the vehicle speed Vx is larger than a predetermined vehicle speed V0. When the vehicle speed Vx is smaller than or equal to the predetermined vehicle speed V0 (S22:No), at step S23, the battery control part 62 performs a normal boosting control. This normal boosting control is a process performed when it is determined that there is no possibility that a backward electric current flows in the booster circuit 40.

The case that the boosting coil 42 of the booster circuit 40 produces heat occurs when the steering wheel 11 is turned repeatedly in the clockwise and counterclockwise directions. When the vehicle is stopped, such a steering operation rarely occurs. Accordingly, the predetermined vehicle speed V0 is set to a small vehicle speed, at which the steering wheel 11 is not turned repeatedly in the clockwise and counterclockwise directions.

Figure 6:
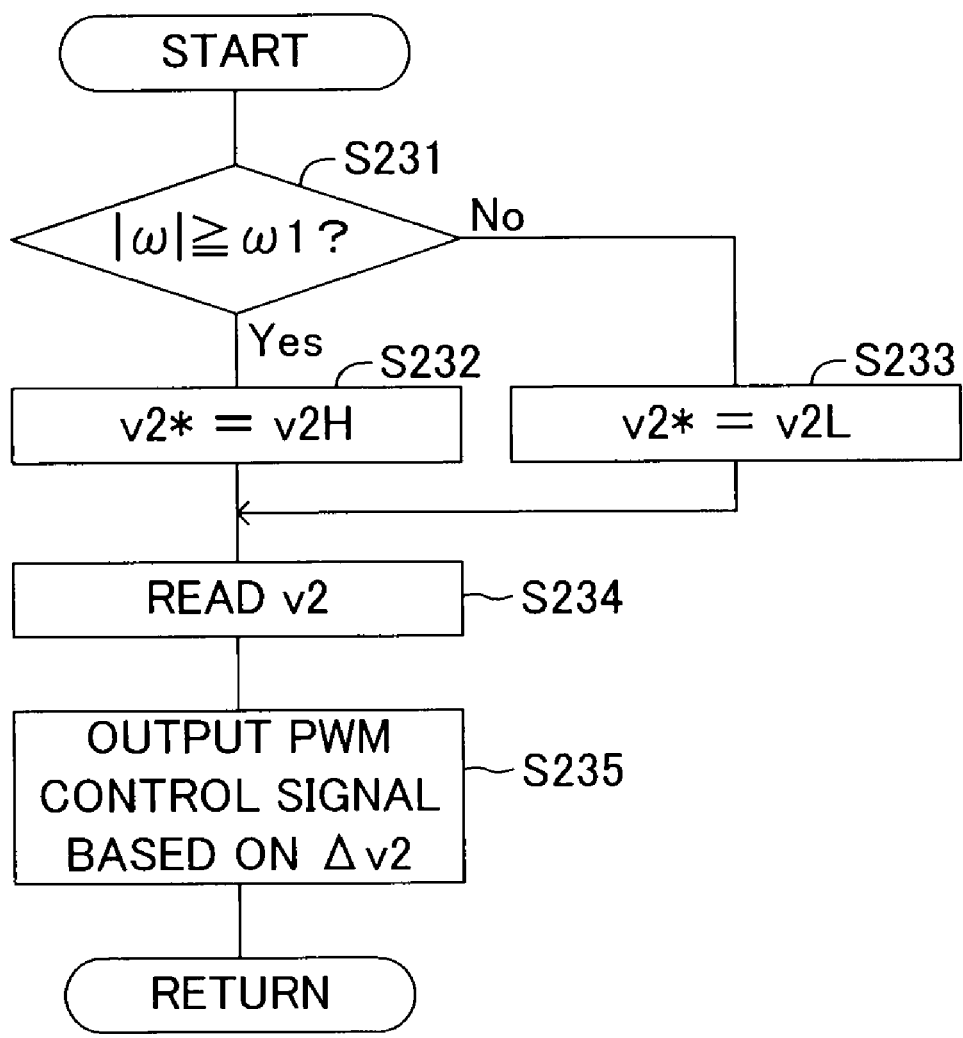
FIG. 6 is a flow chart showing a normal boosting control routine (sub routine).

FIG. 6 is a flow chart showing the normal boosting control process as a sub routine. When the normal boosting control process is initiated, at step S231, the battery control part 62 determines if the magnitude |ω| of the steering speed ω (hereinafter, simply referred to as a steering speed |ω|) is larger than or equal to a reference steering speed ω1. When the steering speed |ω| is larger than or equal to the reference steering speed ω1 (S231:Yes), at step S232, a target boosting voltage v2* is set to v2H, while when the steering speed |ω| is smaller than the reference steering speed ω1 (S231:No), at step S233, the target boosting voltage v2* is set to v2L. v2L is a voltage value lower than v2H. That is, when the steering wheel is being turned rapidly, the battery control part 62 sets the high voltage v2H as the target boosting voltage v2*, while when the steering wheel is being turned slowly or is not being turned, the battery control part 62 sets the low voltage v2L as the target boosting voltage v2*.

For example, the reference steering speed ω1 is set to 8 rad/s, v2L is set to 20V, and v2H is set to 30V. In this case, when the steering speed |ω| is larger than or equal to 8 rad/s, the target boosting voltage v2* is set to 30V, while when the steering speed |ω| is smaller than 8 rad/s, the target boosting voltage v2* is set to 20V.

After the battery control part 62 sets the target boosting voltage v2* as explained above, at following step S234, the battery control part 62 reads a boosting output voltage v2 of the booster circuit 40 from the output voltage sensor 52. Next, at step S235, the battery control part 62 outputs to the boosting switching elements 43 and 44 of the booster circuit 40, PWM control signals having duty ratios adjusted on the basis of the deviation Δv2 between the target boosting voltage v2* and the boosting output voltage v2 to decrease the deviation Δv2. For example, the duty ratios of the boosting switching elements 43 and 44 are set such that the boosting voltage increases when the boosting output voltage v2 detected by the output voltage sensor 52 is lower than the target boosting voltage v2*, or such that the boosting voltage decreases when the boosting output voltage v2 detected by the output voltage sensor 52 is higher than the target boosting voltage v2, and PWM control signals depending on the set duty ratios are outputs to the boosting switching elements 43 and 44, respectively. Then, the normal control routine is terminated once. It should be noted that the first and second boosting switching elements 43 and 44 are controlled such that when the first boosting switching element 43 is in the switch-on condition, the second boosting switching element 44 is in the switch-off condition, while when the first boosting switching element 43 is in the switch-off condition, the second boosting switching element 44 is in the switch-on condition. The normal control routine is incorporated as a sub routine of the boosting control routine which is a main routine, and therefore is repeated by the predetermined short cycle.

The boosting control routine shown in FIG. 5 will be explained. When the vehicle speed Vx is larger than the predetermined vehicle speed V0 (S22;Yes), at step S24, the battery control part 62 determines if the magnitude |ω| (hereinafter, simply referred to as a steering speed |ω|) of the steering speed ω is smaller than a steering-held determination speed ω0. When the steering speed ω is smaller than the steering-held determination speed ω0, it is determined that the steering wheel is in the steering-held condition. The steering-held condition is a condition that the steering wheel 11 is not being turned.

On the other hand, when the steering speed |ω| is larger than or equal to the steering-held determination speed ω0, at step 25, the battery control part 62 reads a steering torque Tr from the assist control part 61. Next, at step S26, the battery control part 62 determines if a sign indicated by the steering torque Tr does not correspond to a sign indicated by the steering speed ω. In the drawings, sign (Tr) represents a sign of the steering torque Tr, that is, the acting direction of the steering torque Tr, and sign (ω) represents a sign of the steering speed ω, that is, the rotation direction of the steering wheel 11. Further, sign (Tr)×sign (ω) is an expression for determining if both signs are the same as each other.

In the returning condition that the steering wheel 11 returns toward its neutral position (zero steering angle position), the rotation direction of the steering wheel 11 and the acting direction of the steering torque Tr detected by the steering torque sensor 21 are opposite to each other. That is, in the returning condition, the steering wheel is operated by using a force generated by the wheel tending to return to its neutral position by a self-aligning torque, and therefore when the driver releases the steering wheel 11, the steering wheel 11 is rapidly operated, and therefore normally, the driver operates the steering wheel 11 against the motion of the steering wheel 11 tending to return to its neutral position. Accordingly, the rotation direction of the steering wheel 11 and the acting direction of the steering torque Tr are opposite to each other.

The operation that the steering wheel 11 is being turned in the direction that the steering wheel 11 moves away from its neutral position is referred to as a turning operation. In the condition that the turning operation occurs, the rotation direction of the steering wheel 11 and the acting direction of the steering torque Tr are the same as each other.

At step S26, when the sign of the steering torque Tr and the sign of the steering speed ω are the same as each other, the battery control part 62 determines that the turning operation is performed, and forwards the process to step S23. Accordingly, when the turning operation occurs, the above-explained normal boosting control is performed.

On the other hand, at step S26, when the sign of the steering torque Tr and the sign of the steering speed ω are different from each other, it is determined that the steering wheel 11 is being returned to its neutral position, and forwards the process to step S27.

When the steering wheel 11 is being turned, the load condition of the electric motor 20 is in a large load condition, and therefore no backward electric current flows in the boosting coil 42 of the booster circuit 40. However, when the turning operation is terminated and the steering wheel 11 is in a steering-held condition or a returning condition, the electric motor 20 becomes a small load condition, and therefore immediately after the turning operation is terminated, a backward electric current is likely to flow in the boosting coil 42 of the booster circuit 40. Further, not immediately after the turning operation is terminated, when the steering wheel 11 is being returned from a condition that it is held at a large steering angle (a steering angle, at which the steering wheel is largely apart from its neutral position), the condition of the electric motor 20 changes from the large load condition to the small load condition, and therefore a backward electric current may flow in the boosting coil 42. Accordingly, except when the steering wheel 11 is being turned, there is a possibility that a backward electric current flows in the boosting coil 42.

Accordingly, when the steering-held condition is detected at step S24, or when the returning condition is detected at step S26, the flow of the backward electric current in the boosting coil 42 is prevented by the process of step S27 and steps following it.

At step S27, the battery control part 62 reads information on a sub battery voltage. Independently of the boosting control routine, the battery control part 62 periodically performs a process for detecting a sub battery voltage vsub by using the sub battery voltage sensor 53, and memorizes the detected latest sub battery voltage vsub in a memory (the RAM or a nonvolatile memory) provided in the electronic control device 60. Accordingly, the process of the step S27 is a process for reading the latest sub battery voltage vsub memorized in the memory.

Next, at step S28, the battery control part 62 determines if the sub battery voltage vsub obtained from the information on the sub battery voltage is below a set voltage vsub0. The set voltage vsub0 is a voltage value predetermined for determining if the electric power supply ability of the sub battery device 50 is below a prescribed value. Accordingly, when the sub battery voltage vsub is higher than or equal to the set voltage vsub0, it can be determined that the electric power supply ability of the sub battery device 50 is larger than or equal to the prescribed value, while when the sub battery voltage vsub is below the set voltage vsub0, it can be determined that the electric power supply ability of the sub battery device 50 is less than the prescribed value.

When the battery control part 62 determines that the sub battery voltage vsub is higher than or equal to the set voltage vsub0 (S28:No), at step 29, the battery control part 62 stops the boosting operation of the booster circuit 40. In this case, PWM control signals for setting duty ratios of the first and second boosting switching element 43 and 44 to zero percent (off) are output to the first and second boosting switching elements 43 and 44. Accordingly, the condition of the second boosting switching element 44 becomes the switch-off condition, and therefore no backward electric current flows in the booster circuit 40.

On the other hand, when it is determined that the sub battery voltage vsub is lower than the set voltage vsub0 (S28:Yes), at step S30, a target boosting voltage v2* is calculated by the following expression (eq. 1).

$$v2^* = v\text{sub} + \Delta v \quad \text{(eq. 1)}$$

At the following step S31, the battery control part 62 reads a boosting input voltage v1 detected by the input voltage sensor 51. Next, at the step S32, a target duty ratio D of the first boosting switching element 43 of the booster circuit 40 is calculated by the following expression. It should be noted that the switch-on-and-off condition of the second boosting switching element 44 is opposed to that of the first boosting switching element 43, and therefore the target duty ratio of the second boosting switching element is (1−D).

$$D = (v2^* - v1)/v2^* \quad \text{(eq. 2)}$$

The above-mentioned expression (eq. 2) is derived from a relational expression of the boosting voltage shown by the following expression (eq. 3).

$$v2 = v1 \times ((D/(1-D)) + 1) \quad \text{(eq. 3)}$$

In this expression, v2 is an output voltage of the booster circuit 40 and v1 is an input voltage of the booster circuit 40. The expression (eq. 2) can be derived by changing v2 of the expression (eq. 3) to the target boosting voltage v2*.

Next, at step S33, the battery control part 62 outputs to the first boosting switching element 42 a PWM control signal for setting the duty ratio of the first boosting switching element 42 to the above-mentioned duty ratio D, outputs to the second boosting switching element 43 a PMW control signal for instructing the second boosting switching element 43 to perform a switch-on-and-off operation opposed to that of the first boosting switching element 42, and terminates this boosting control routine once.

According to the above-explained boosting control routine of the first embodiment, information on a steering condition (ω, Tr) is acquired from the assist control part 61, and a steering condition is determined on the basis of the information on the steering condition. Then, when the steering condition is a steering-held condition or a returning condition, it is determined that there is a possibility that a backward electric current flows in the boosting coil 42, while when the steering condition is a turning condition, it is determined that there is no possibility that a backward electric current flows in the boosting coil 42. Further, information on the vehicle speed (Vx) is also acquired from the assist control part 61, and when vehicle speed Vx is smaller than or equal to the set vehicle speed V0, it is determined that there is no possibility that a backward electric current flows in the boosting coil 42.

Figure 7:
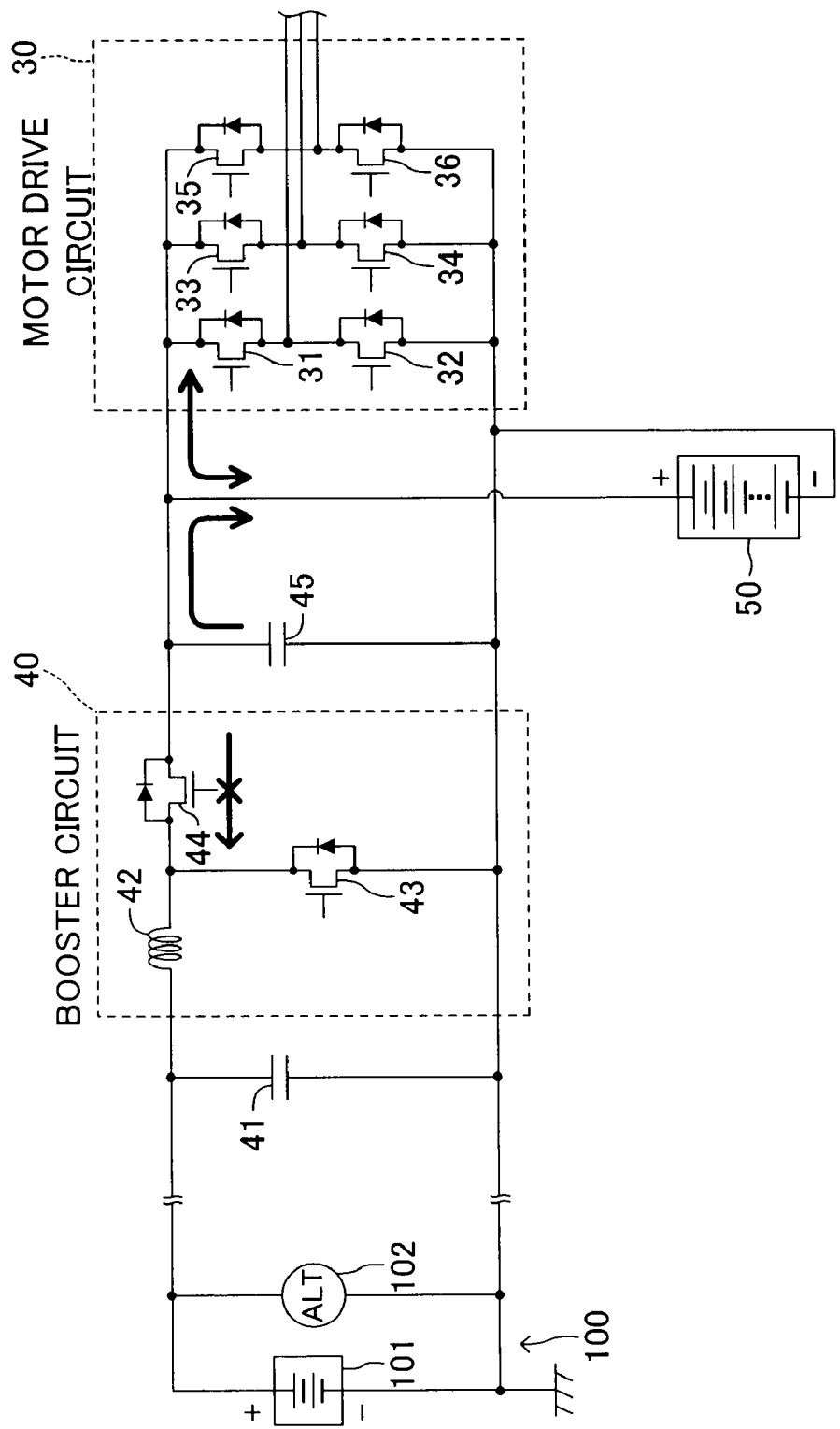
FIG. 7 is a view for explaining a flow of an electric current.

Then, when the steering condition is a steering-held condition or a returning condition, in the case that the electric power supply ability of the sub battery device 50 is large (vsub>=vsub0), the flow of a backward electric current in the boosting coil 42 is prevented by stopping the operation of the booster coil 40 (switching off the boosting switching elements 43 and 44). In this case, as shown by an arrow in FIG. 7, a surplus energy stored in the condenser 45 and an electric generation energy of the electric motor 20 flow into the sub battery device 50 as a charge electric current. Accordingly, the heat production due to a hysteresis loss of the booster coil 42 is prevented. Further, the electric power supply system to the motor drive circuit 30 is only the sub battery device 50, however, since the electric power supply ability of the sub battery device 50 is large and no large electric power is requested in the steering-held condition or the returning condition, the shortage of the amount of the electric power supply does not occur.

On the other hand, even when the steering condition is the steering-held condition or the returning condition, in the case that the electric power supply ability of the sub battery device 50 is small (vsub<vsub0), the operation of the booster circuit 40 is not stopped, and the target boosting voltage v2* is set to a voltage higher than the sub battery voltage vsub. This is because in the case that the electric power supply ability of the sub battery device 50 is small, when the electric power supply from the booster circuit 40 to the motor drive circuit 30 is stopped, the electric power supply to the electric motor 20 runs short, and because in the case that the requested electric power supply of the electric motor 20 is large (at a large output drive), when the electric power supply of the sub battery device 50 is small, the requested electric power cannot be satisfied even by the sum of the outputs of the booster circuit 40 and the sub battery device 50. When such a shortage of the amount of the electric power supply to the electric motor 20 occurs, a desired steering assist property cannot be obtained.

Figure 8:
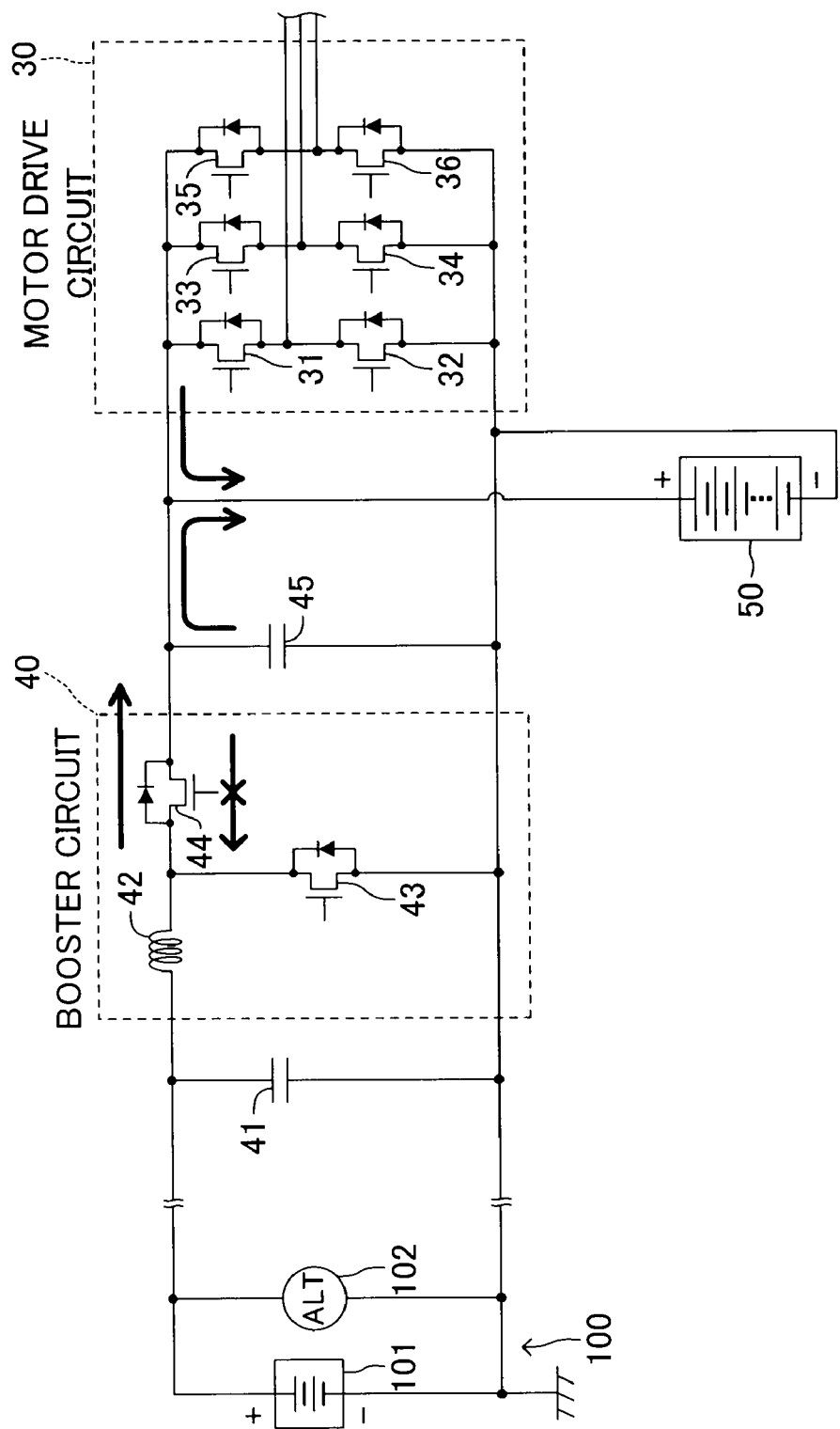
FIG. 8 is a view for explaining a flow of an electric current.

According to this embodiment, in the case that the electric power supply ability of the sub battery device is small, as shown by arrows in FIG. 8, a surplus energy stored in the condenser 45 and an electric generation energy is applied to the sub battery device 50 as a charge electric current by setting the target boosting voltage v2* to a voltage higher than the sub battery voltage vsub. Thereby, the flow of a backward electric current to the boosting coil is prevented. As a result, the heat production due to a hysteresis loss of the booster coil 42 is prevented. Further, the sub battery device 50 is charged by the difference ($\Delta v$) in the voltage between the sub battery device 50 and the booster circuit 40, and therefore the electric power supply ability of the electric power steering device is enhanced.

Figure 9:
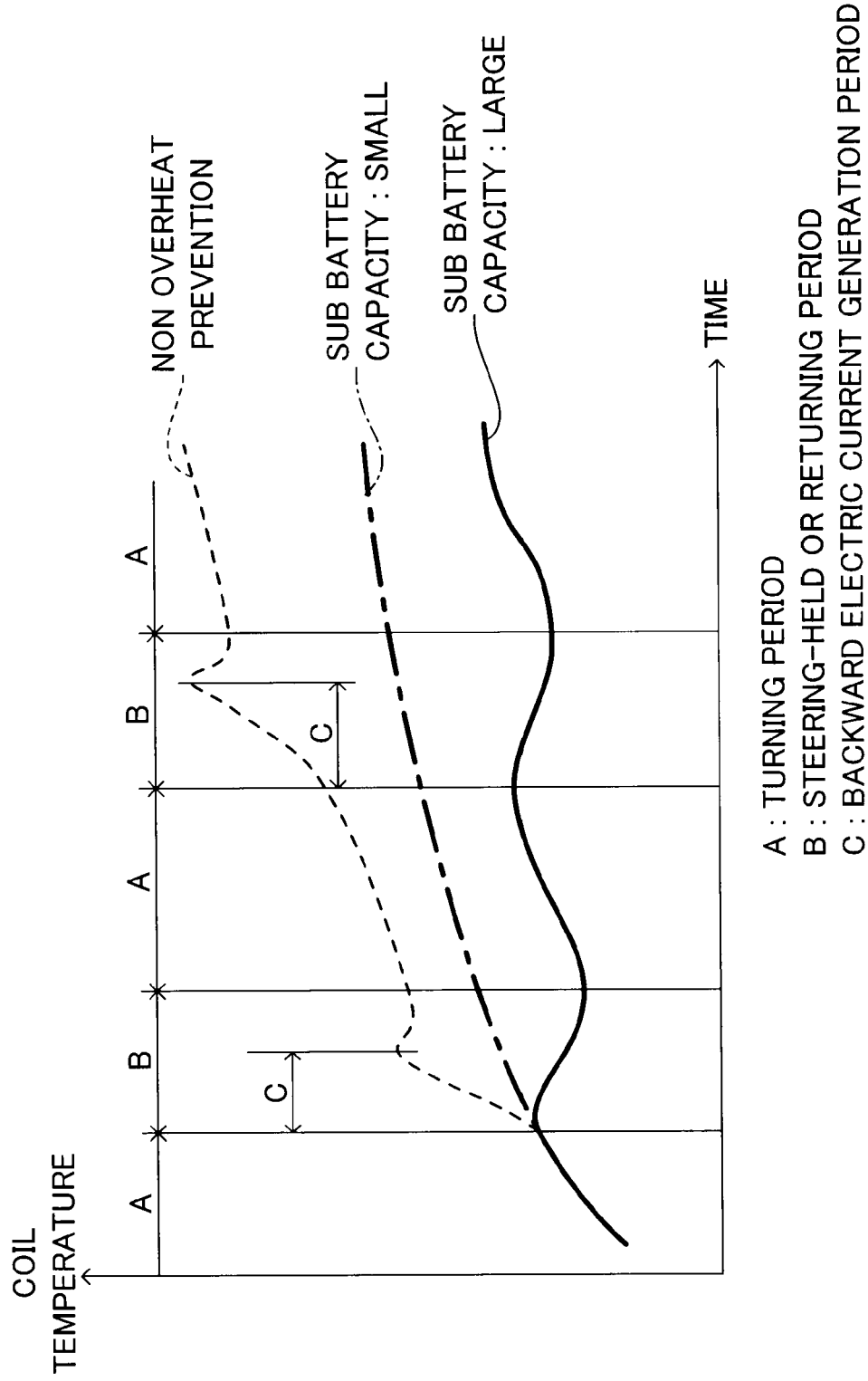
FIG. 9 is a graph showing a change of a temperature of a boosting coil.

FIG. 9 is a graph showing a change of a temperature of the boosting coil 42. Wave lines indicated by solid and chain lines show a change of the temperature in the case that the boosting control routine of this embodiment is performed to prevent the boosting coil 42 from being overheated, and a broken line shows a change of the temperature in the case that the boosting coil 42 is not prevented from being overheated.

The wave line indicated by the solid line shows a change of the temperature in the case that the sub battery voltage vsub is higher than the set voltage sub0, i.e. in the case that the amount of the charged electric power of the sub battery device 50 is larger than the prescribed value. In this case, at a period B that the steering wheel 11 is held or being returned, the boosting operation of the booster circuit 40 is stopped and the boosting switching elements 43 and 44 are switched off, and therefore positive and backward electric currents do not flow and the temperature of the boosting coil 42 decreases.

The wave line indicated by the chain line shows a change of the temperature in the case that the sub battery voltage vsub is below the set voltage vsub0, i.e. in the case that the amount of the charged electric power of the sub battery device 50 is smaller than the prescribed value. In this case, at the period B that the steering wheel 11 is held or being returned, the target boosting voltage v2* is set to a voltage higher than the sub battery voltage vsub by $\Delta v$ and the boosting operation is performed, and therefore no backward electric current flows in the boosting coil 42. Accordingly, only positive electric current flows in the boosting coil 42, and therefore the increase of the temperature of the boosting coil is prevented.

The wave line indicated by the broken line shows a change of the temperature in the case that the overheat of the boosting coil 42 is not prevented. In this case, at a period C immediately after the turning operation of the steering wheel 11 (period A) is terminated, a backward electric current flows in the boosting coil 42, and therefore the temperature of the boosting coil 42 rapidly increases.

As understood by such temperature changes, according to the electric power steering device of this embodiment, the overheat of the boosting coil 42 can be prevented. Further, according to the prior electric power steering device, in order to prevent an electric circuit such as an electric power supply circuit or a motor drive circuit from being overheated, an electric power steering device is known that an upper limit is applied to a target electric current ias* in a steering assist control, however, according to this embodiment, the overheat of the boosting coil 42 is prevented and it is not necessary to apply an upper limit to the target electric current ias*, and therefore a sufficient steering assist can be obtained.

Further, the overheat of the boosting coil 42 can be prevented, and therefore the boosting coil 42 can be downsized. Further, the boosting efficiency can be enhanced by employ a boosting coil 42 having a small resistance.

Further, the operation frequency of the boosting switching elements 43 and 44 is decreased by stopping the boosting operation of the booster circuit 40, and an oscillation due to the backward electric current is prevented, and therefore an operating noise of the booster circuit 40 can be decreased.

Further, it is estimated if there is a possibility that a backward electric current flows only in the condition that the vehicle runs at the vehicle speed Vx larger than or equal to the predetermined set vehicle speed V0, and therefore the process of the estimation of the flow of a backward electric current can be decreased.

Next, a second embodiment relating to the boosting control process will be explained. The constitution of the second embodiment is the same as that the first embodiment except for the boosting control process.

According to the first embodiment, it is estimated if there is a possibility that a backward electric current flows in the boosting coil 42 on the basis of the steering condition, while according to the second embodiment, it is estimated if there is a possibility that a backward electric current flows in the boosting coil 42 on the basis of input and output voltages of the booster circuit 40 and switch-on and switch-off periods of the first boosting switching element 43.

Figure 10:
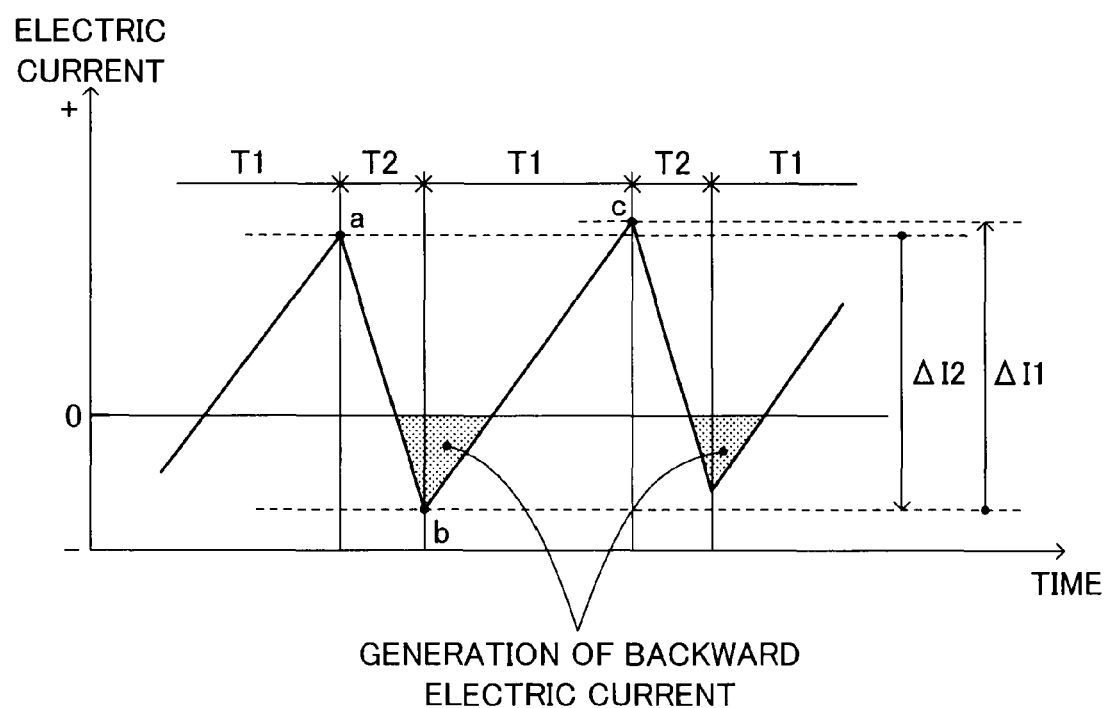
FIG. 10 is a graph showing a change of an electric current flowing in a booster circuit.

When a single switch-on period of the first boosting switching element 43 is shown by T1 and a single switching-off period of the first boosting switching element 43 is shown by T2, the electric current flowing in the boosting coil 42 changes as shown in FIG. 10.

When the input voltage of the booster circuit 40 is V1, the output voltage of the booster circuit is V2, the amount of the change of the electric current by a single switch-on operation of the first boosting switching element 43 is ΔI1, and the amount of the change of the electric current by a single switching-off operation of the first boosting switching ele- ment 43 is ΔI2, ΔI1 and ΔI2 can be expressed by following expressions (eq. 4) and (eq. 5), respectively. It should be noted that in FIG. 10, the amount of the change of the electric current from a point a to a point b is ΔI2, and the amount of the change of the electric current from a point b to a point c is ΔI1.

$$\Delta I1 = (V1/L) \times T1 \quad\quad\quad (eq. 4)$$

$$\Delta I2 = (-(V1-V2)/L) \times T2 \quad\quad\quad (eq. 5)$$

On the basis of the two expressions (eq. 4) and (eq. 5), the electric current I2 after boosting operation can be calculated by a following expression (eq. 6)

$$I2 = \Delta I1 - \Delta I2 = ((T1+T2) \times V1 - T2 \times V2)/L \quad\quad\quad (eq. 6)$$

Accordingly, in the case that the electric current I2 obtained by the expression (eq. 6) is negative, i.e. in the case that the peak of the decreasing value in FIG. 10 is negative, it can be estimated that a backward electric current flows in the boosting coil 42.

T1 and T2 are boosting control parameters, and therefore can be known in the battery control part 62. Further, V1 can be the boosting input voltage v1 detected by the input voltage sensor 51. Further, V2 can be the target boosting voltage v2*. It should be noted that V2 may be the boosting output voltage v2 detected by the output voltage sensor 52. L is a known constant.

Accordingly, in the case that the value of ((T1+T2)×v1− T2×v2*) is negative, it can be estimated that a backward electric current flows in the boosting coil 42.

A boosting control routine for preventing a backward electric current from flowing by using the above-mentioned estimation will be explained. FIG. 11 shows a boosting control routine of the second embodiment. The boosting control routine of the second embodiment performs processes of steps S41-S43 in place of those of the steps S24-S26 of the boosting control routine of the first embodiment. Accordingly, here, the explanation of the same processes as those of the first embodiment will be omitted by indicating the processes indicated by the same step numbers as those in the first embodiment.

The boosting control routine is memorized as a control program in the ROM of the electronic control unit 60, is initiated by the switch-on (on) of the ignition switch 106, and is repeatedly performed by a predetermined short cycle.

When at step S22, the battery control part 62 determines that the vehicle speed Vx exceeds the set vehicle speed V0 (S22:Yes), at step S42, the battery control part 62 reads switching information indicating single present switch-on and switching-off periods T1 and T2 of the first boosting switching element 43 and information indicating the target boosting voltage v2*. The switching cycle of the first boosting switching element 43 is known (a constant value), and therefore in this embodiment, information indicating a duty ratio is acquired and the above-mentioned switching information is calculated on the basis of the switching cycle and the duty ratio.

The boosting control routine is repeated by the predetermined short cycle, and therefore at step S41, the duty ratio and the target boosting voltage v2* calculated at the last process are read. It should be noted that the battery control part 62 is constituted such that every the battery control part 62 calculates the duty ratio and the target boosting voltage v2*, the battery control part 62 memorizes the latest calculation results in the RAM, or the like and can read them at the next cycle. Further, an initial value at the beginning of the control can be arbitrarily set.

Next, at step S42, the battery control part 62 reads the boosting input voltage v1 detected by the input voltage sensor 51.

Next, at step S43, the battery control part 62 determines if the following determination condition expression (eq. 7) for estimating a generation of a backward electric current is established.

$$((T1+T2) \times v1 - T2 \times v2^*) < 0 \quad\quad\quad (eq. 7)$$

When the determination condition expression is not established, i.e. when ((T1+T2)×v1−T2×v2*)>=0, it is determined that there is no possibility that a backward electric current flows in the booster coil 42 and the normal boosting control process of step S23 is performed.

On the other hand, when the determination condition expression is established, it is determined that there is a possibility that a backward electric current flows in the boosting coil 42, and the above-explained processes of step S27 and the steps following it are performed. That is, when the sub battery voltage vsub is higher than or equal to the set voltage vsub0, the boosting operation is stopped, while when the sub battery voltage vsub is below the set voltage vsub0, the target boosting voltage v2* is set to a voltage higher than the sub battery voltage vsub by Δv to prevent a backward electric current from being generated.

The above-explained boosting control routine of the second embodiment has effects similar to those of the first embodiment. Further, according to the second embodiment, it is estimated if a backward electric current is generated on the basis of the information on input and output voltages of the boosting circuit 40 and the switching information, and therefore the accuracy of the estimation is high.

The electric power steering device of the embodiment according to the invention has been explained, however, the invention is not limited to the above-explained embodiments, and can be variously modified without departing from the object of the invention.

For example, in the embodiment, when there is a possibility that a backward electric current is generated, the control pattern is changed on the basis of the result obtained by the comparison of the sub battery voltage vsub with the set voltage vsub0, however, the boosting operation of the booster circuit 40 may be stopped independently of the sub battery voltage vsub to simplify the control pattern. That is, only step S28 out of the steps S27-S33 may be performed.

Further, according to the embodiment, when the normal boosting control is performed, two kinds of the target boosting voltages v2* are set, depending on the steering speed |ω|, however, the invention is not limited thereto, and a single kind of the target boosting voltage v2* may be set, or three or more kinds of the target boosting voltages v2* may be set. Further, without setting the target boosting voltage v2*, the boosting control may be performed on the basis of the amount of the charged electric power of the sub battery device 50.

Further, according to the embodiment, the operation of the second boosting switching element 44 is controlled such that the switch-on-and-off condition of the second boosting switching element 44 is opposed to that of the first boosting switching element 43, however, the condition of the second boosting switching element 44 may be maintained in the switch-on condition during the boosting.

Further, according to the embodiment, a constitution to drive the three-phase brushless motor by the inverter circuit is employed, however, a constitution to drive a single-phase motor by an H bridge circuit may be employed.

Further, according to the embodiment, the battery control part 62 and the assist control part 61 are provided in the electronic control device 60, however, the control parts 61 and 62 may be constituted independently by micro computers.

The invention claimed is:

1. An electric power steering device, comprising:
    an electric motor that applies a steering assist torque to a steering mechanism;
    a booster circuit that boosts a voltage of an electric power supplied from a vehicle battery device and that supplies the boosted electric power to a motor drive circuit;
    a sub battery device connected to said booster circuit in parallel to said motor drive circuit, which sub battery device being charged by an output of said booster circuit and assists an electric power supply to said motor drive circuit by using charged electric energy; and
    a motor control unit that controls said motor drive circuit such that an amount of electric current depending on a steering operation of a steering wheel is supplied to said electric motor;
    wherein the electric power steering device further comprises:
    an estimation unit that estimates if there is a possibility that a backward electric current flows in said booster circuit toward said vehicle battery device; and
    a boosting control unit that stops the boosting operation of said booster circuit to prevent a backward electric current from flowing in said booster circuit when it is estimated by said estimation unit that there is a possibility that a backward electric current flows.

2. The electric power steering device as set forth in claim 1, wherein said estimation unit has a steering information acquirement unit that acquires information on a steering condition of said steering wheel, and estimates that there is a possibility that a backward electric current flows in said booster circuit when the steering condition detected on the basis of the information on the steering condition is a returning condition or a steering-held condition of said steering wheel.

3. The electric power steering device as set forth in claim 2, wherein said booster circuit has a boosting coil provided in an electric power supply channel in series therewith, a first switching element that intermittently flows an electric current in said booster coil to generate an electric energy in said booster coil, and a second switching element provided in said electric power supply channel in series therewith that discharges the electric energy generated in said boosting coil to said electric power supply channel during the switch-off period of said first switching element, and
    said boosting control unit maintains conditions of said first and second switching elements in a switch-off condition when the boosting operation of said booster circuit is stopped.

4. The electric power steering device as set forth in claim 3, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

5. The electric power steering device as set forth in claim 3, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

6. The electric power steering device as set forth in claim 2, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

7. The electric power steering device as set forth in claim 6, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

8. The electric power steering device as set forth in claim 2, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

9. The electric power steering device as set forth in claim 1, wherein said booster circuit has a boosting coil provided in an electric power supply channel in series therewith, a first switching element that intermittently flows an electric current in said boosting coil to generate an electric energy in said boosting coil, and a second switching element provided in said electric power supply channel in series therewith that discharges the electric energy generated in said boosting coil to said electric power supply channel during a switch-off period of said first switching element, and
    said estimation unit has a voltage information acquirement unit that acquires information on an input voltage of said booster circuit and information on an output voltage of said booster circuit, and a switching information acquirement unit that acquires information on a switching indicating single switch-on and switch-off periods of said first switching element, and estimates if there is a possibility that a backward electric current flows on the basis of the acquired information on the input and output voltages of said booster circuit and the acquired information on the switching.

10. The electric power steering device as set forth in claim 9, wherein said booster circuit has a boosting coil provided in an electric power supply channel in series therewith, a first switching element that intermittently flows an electric current in said booster coil to generate an electric energy in said booster coil, and a second switching element provided in said electric power supply channel in series therewith that discharges the electric energy generated in said boosting coil to said electric power supply channel during the switch-off period of said first switching element, and said boosting control unit maintains conditions of said first and second switching elements in a switch-off condition when the boosting operation of said booster circuit is stopped.

11. The electric power steering device as set forth in claim 10, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

12. The electric power steering device as set forth in claim 10, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

13. The electric power steering device as set forth in claim 9, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

14. The electric power steering device as set forth in claim 9, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

15. The electric power steering device as set forth in claim 1, wherein said booster circuit has a boosting coil provided in an electric power supply channel in series therewith, a first switching element that intermittently flows an electric current in said booster coil to generate an electric energy in said booster coil, and a second switching element provided in said electric power supply channel in series therewith that discharges the electric energy generated in said boosting coil to said electric power supply channel during the switch-off period of said first switching element, and said boosting control unit maintains conditions of said first and second switching elements in a switch-off condition when the boosting operation of said booster circuit is stopped.

16. The electric power steering device as set forth in claim 15, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

17. The electric power steering device as set forth in claim 15, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

18. The electric power steering device as set forth in claim 1, further comprising a sub battery ability detection unit that detects an electric power supply ability of said sub battery device, wherein said boosting control unit controls the boosting operation to maintain the output voltage of said booster circuit at a voltage higher than an output voltage of said sub battery device in place of a stopping operation of the boosting operation when it is estimated that there is a possibility that a backward electric current flows by said estimation unit and the electric power supply ability of said sub battery device is below a prescribed value.

19. The electric power steering device as set forth in claim 18, wherein said estimation unit has a vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

20. The electric power steering device as set forth in claim 1, wherein said estimation unit has vehicle speed information acquirement unit that acquires information on a vehicle speed, and estimates if there is a possibility that a backward electric current flows in a condition that the vehicle speed indicated by the information on the vehicle speed is larger than or equal to a predetermined set vehicle speed.

* * * * *